Nov. 7, 1961   R. P. MUNDELL ET AL   3,007,501
COMBINATION WOODWORKING MACHINE
Filed June 11, 1959   3 Sheets-Sheet 1
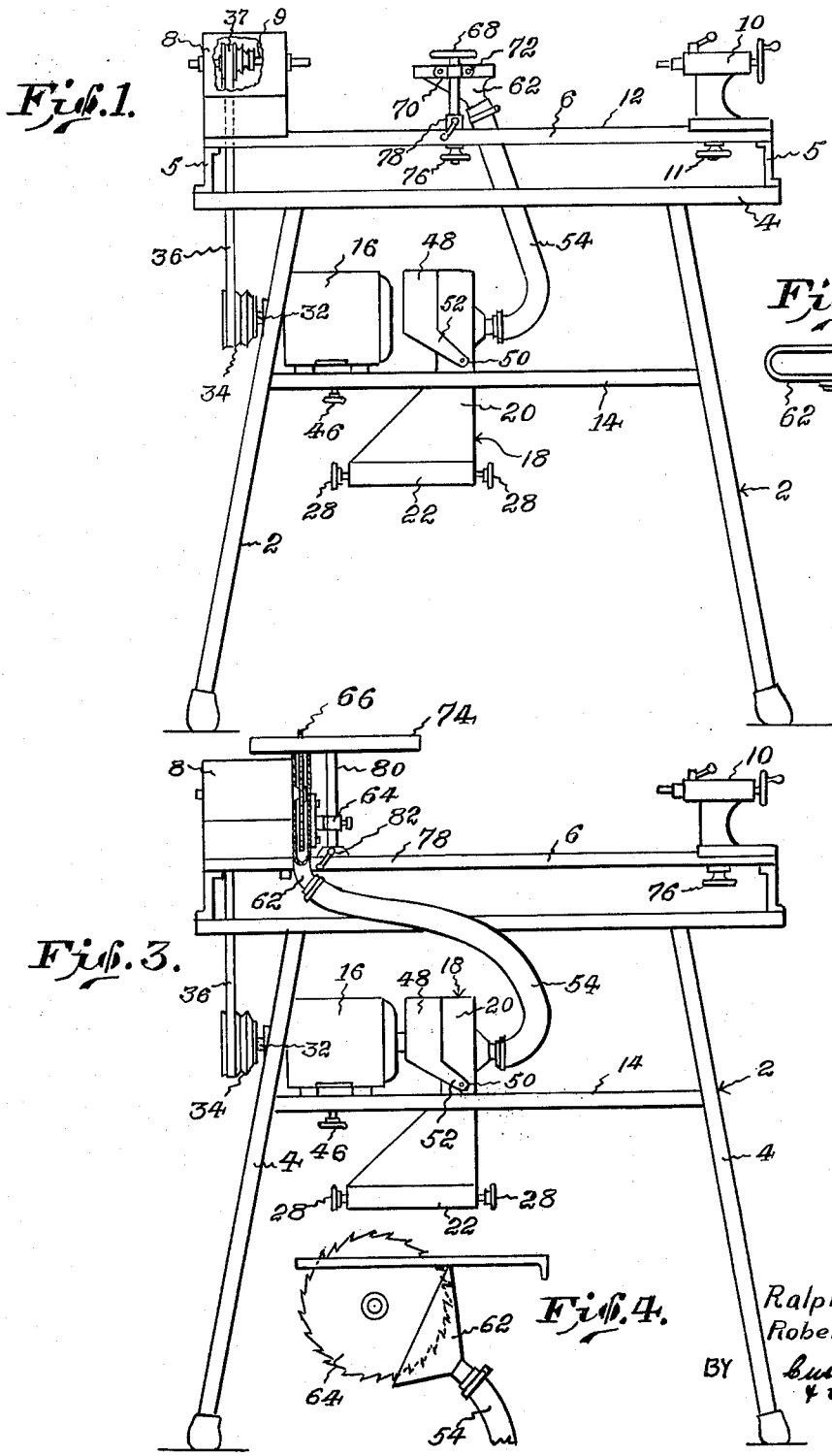
INVENTORS.
Ralph P. Mundell.
Robert E. Mundell.
BY
ATTORNEYS.

Nov. 7, 1961   R. P. MUNDELL ET AL   3,007,501
COMBINATION WOODWORKING MACHINE
Filed June 11, 1959   3 Sheets-Sheet 2
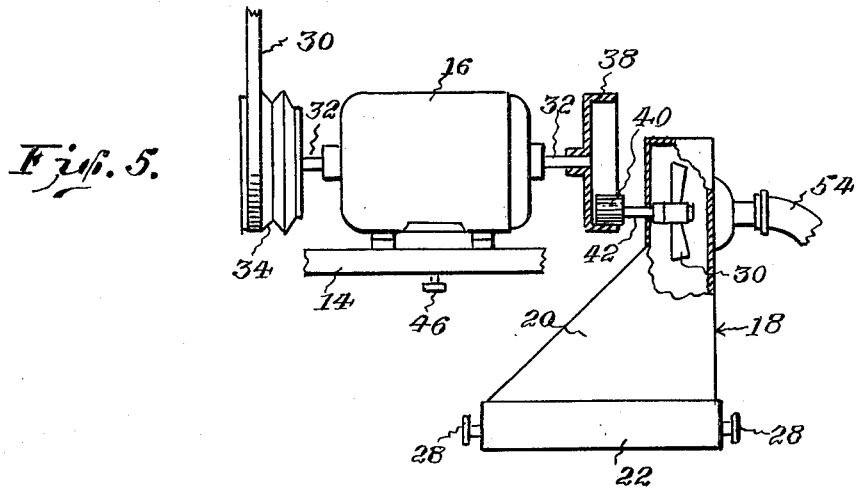
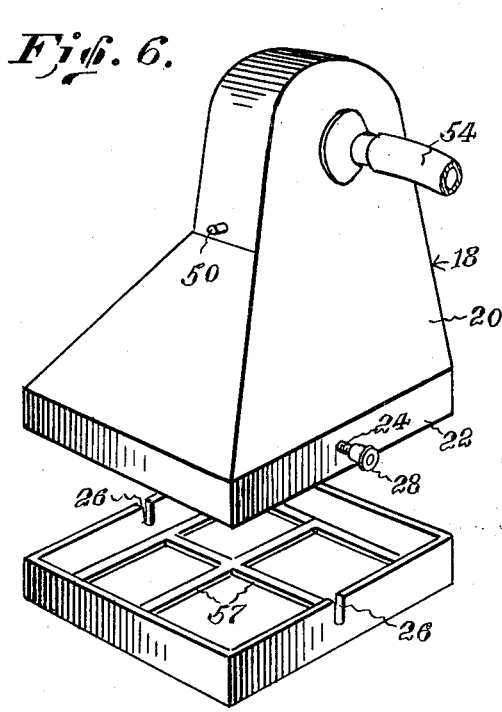
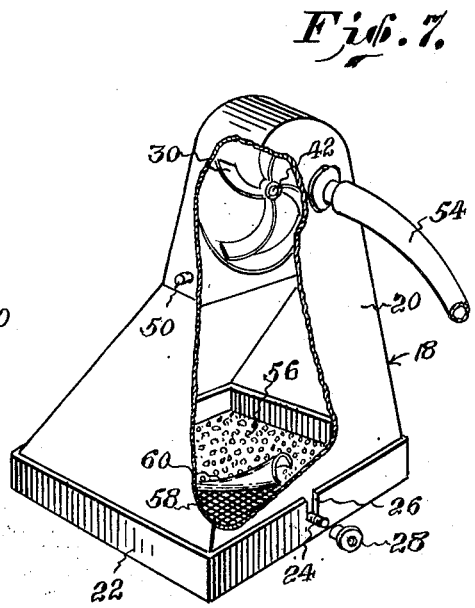
INVENTORS
Ralph P. Mundell.
Robert E. Mundell.
BY Cushman, Darby & Cushman
ATTORNEYS

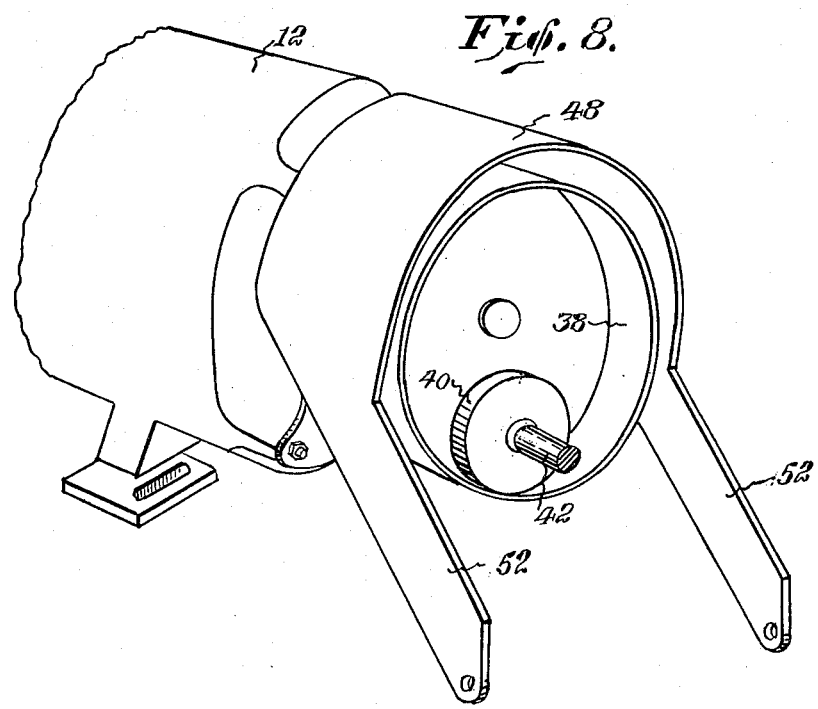
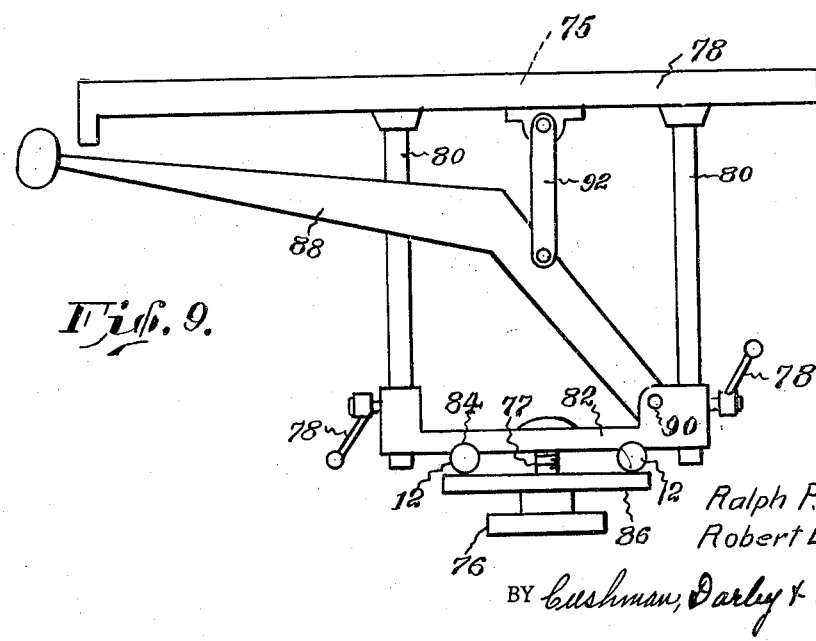

United States Patent Office 3,007,501
Patented Nov. 7, 1961

3,007,501
COMBINATION WOODWORKING MACHINE
Ralph P. Mundell and Robert E. Mundell, Fairmont,
W. Va., assignors to HanDman, Inc., Grafton, W. Va.,
a corporation of West Virginia
Filed June 11, 1959, Ser. No. 819,701
6 Claims. (Cl. 144—252)

This invention relates to a lathe having a means mounted thereon for carrying away and collecting waste material produced in the normal operations of the lathe.

The principal object of the invention is to provide a lathe with a suction means in proximity to the cutting tools so as to carry waste material, such as dust, chips, cuttings and other debris, away from the working area of the lathe.

Another object of the invention is to transmit power to both the head stock of the lathe and to a suction producing means from the same motor shaft.

A still further object of this invention is to provide a suction housing having a removable lower section provided with a reticulated lower wall and a filter means.

Other objects and advantages of the invention will be evident from the following description and the accompanying drawing.

Referring to the drawing:

FIGURE 1 is a side elevation of a lathe showing the suction dust, cuttings and chip collector mounted thereon;

FIGURE 2 is a detail view of the upper end of the dust, cuttings and chip collector shown in FIGURE 1;

FIGURE 3 is a view similar to FIGURE 1 but showing the dust cuttings and chip collector applied to a circular saw;

FIGURE 4 is a detail view in side elevation showing the relationship of the upper end of the collector to the cutting edge of a saw;

FIGURE 5 is a side elevation with parts in section of the fan housing and the motor which furnishes power to the head stock of the lathe and to the fan;

FIGURE 6 is an exploded view of the upper and lower parts of the fan housing;

FIGURE 7 is a view in perspective with parts broken away of the fan housing;

FIGURE 8 is a detail view in perspective showing the friction drive connection between the fan and the motor, and the guard which covers the drive connection; and FIGURE 9 is a side elevation of the means used to raise the saw table and adjustably secure it in position on the lathe bed.

In the drawings, there is illustrated a combination woodworking machine adapted to function as a lathe, drill press, power operated saw and the like. It comprises a frame having four legs 2 connected at their upper ends to a horizontal table-like frame 4 having end brackets 5 which support a bed 6 in the form of a pair of parallel bars 12 which are circular in cross-section, as shown in FIGURE 9. Suitably clamped upon the bars 12 is a head stock assembly represented generally at 8 and including a horizontal rotary shaft 9 journalled in suitable bearings and adapted to receive tools of various types, work-holding chucks or the like. A tail stock 10 is mounted for longitudinal movement upon the bars 12, where it may be clamped in a predetermined position by a suitable clamping knob 11 mounted on a threaded extension below the tail stock and extending between the bars.

As shown in FIGURES 1 and 3, a lower horizontal frame 14, consisting of back, front, and end elements is carried by the legs 2 a suitable distance below the upper frame 4 for the purpose of supporting an electric motor 16 and the fan housing 18. The latter comprises an upper section 20 and a lower section 22 suitably secured together by bolts 24 carried by the upper section and adapted to be disposed in slots 26 in the lower section by nuts 28 as shown in FIGURES 6 and 7. The entire fan housing is mounted for relative vertical adjustment on the lower frame 14 by suitable means not shown.

In order to furnish power to both the head stock 8 and the fan 30 rotatably mounted in the fan housing, the motor shaft 32 projects from the motor 16 as best shown in FIGURE 5. The outer end of shaft 32 carries a multistep pulley 34 from which a V-belt 36 transmits power to a similar pulley 37 associated with the head stock and fast on the shaft 9. The other end of shaft 32 carries the cup wheel 38 which frictionally engages a rubber wheel 40 mounted on the outer end of the fan shaft 42, to transmit power from the motor to the fan 30.

The motor may be pivotally connected to and supported by the rear element of the frame 14, as viewed in FIGURES 1 and 2, and be adjustably supported relative to the front element of the frame 14 by an adjusting screw 46 carried thereby and engaging the motor support. By raising and lowering the screw 46, the motor and pulley 34 may be raised and lowered to vary the tension on belt 36.

In order to cover and protect the drive connection between the motor and fan shafts, the fan housing 18 has an arcuate guard 48 pivotally attached thereto by means of the bolts 50 and the extensions 52 and is adapted to be swung on the bolts 50 to or from the position shown in FIGURES 1, 3 and 8.

Since it is the purpose of the fan 30 to draw dust, cuttings, chips and other debris into the housing 19 from the different tools that may be used on the combination woodworking machine, a hose 54 is connected at one end to the housing and has its other end supported in proximity to the saw or or other tool mounted on shaft 9 or being held by hand when the work piece is mounted in the head and tail stocks, so that the suction conditions created by the fan in the fan housing will draw such waste materials into the lower section 22 of the fan housing where it will be retained until removed. Such waste material is indicated at 56 in FIGURE 7 in which the lower housing section is shown as having a reticulated bottom wall 57 which supports a wire screen 58 upon which a filter layer 60 of cleansing tissue is arranged. As indicated in FIGURES 1, 2, 3, and 4, the outer end of the hose 54 is provided with a suction nozzle 62 of substantially flattened funnel shape to be secured in any suitable manner, such as by the bracket 64, in a position to surround a portion of a circular saw 66, as shown in FIGURE 4, or in proximity to a tool rest 68 to which it may be secured by clamp means comprising the clamping plate 70 and the bolts 72, as shown in FIGURES 1 and 2. As is well known in the art, the tail stock 10, the tool rest 68 and the saw table 74 are adjustably secured in their operative positions by the clamping members 11, 76, and 78.

Referring now to FIGURE 9, the saw table 74 has the usual slot 75 therein through which the saw projects, and is provided with a pair of spaced depending posts 80 which are adjustably mounted in vertical bores in the guide member 82, the guide member 82 being recessed at 84 on its lower side to receive the parallel bars or guideways 12 which are clamped between the clamping bar 86 and the guide member 82 by the clamping knob 76, threaded on bolt 77. In order to move the table 74 up and down in the member 82, to change its vertical adjustment, a lever 88 is pivoted at 90 to the member 82 at its inner end, and is connected to the table 74 by a pivoted link 92. When the table has been moved either up or down to the desired position by the lever 88, it is secured in such position by the clamping members 78.

From the above detailed description of our machine, it is believed that its operation and advantages over similar machines now in use will be understood and appreciated. Our machine enables the operator to keep his lathe and floor therearound free of dust, chips, cuttings and other debris at all times. By using the double shaft extension motor, we are enabled to use the same source of power for both the lathe head stock, power tools driven thereby, and the fan or suction producing means.

One embodiment of our invention has been shown and described but it will be obvious that various changes and modifications may be made therein without departing from the spirit and scope thereof as defined in the following claims.

We claim:

1. In combination with a lathe having a bed, and a frame arranged in spaced parallel relation to and below said bed; a suction housing on said frame, a suction producing means in said housing, said means having a rotary shaft extending laterally from said housing, a motor on said frame adjacent said housing for driving said lathe, said motor having a rotary shaft extending toward said means, a friction drive between said shafts for transmitting motion from said motor to said means, a tool supporting means on said bed, a hose connected at its lower end to and being in fluid conducting communication with said housing and having its upper end supported in proximity to said tool supporting means.

2. In combination with a lathe having a bed, a head stock on said bed, and a frame arranged in spaced parallel relation to and below said bed; a suction housing carried by said frame, a suction producing means in said housing, said means having a rotary shaft projecting laterally from said housing, a motor on said frame adjacent said housing, said motor having a rotary shaft projecting laterally in opposite directions therefrom, one end of said motor shaft extending toward said means, a friction drive between said one end of said motor shaft and said rotary shaft of said means for transmitting motion from said motor to said means, a cutting tool carried by said head stock, a hose connected at its lower end to and being in fluid conducting communication with said suction housing and having its other end supported in proximity to said cutting tool, and means for transmitting rotary motion from the other end of said motor shaft to said cutting tool.

3. A structure as defined in claim 1 in which said friction drive comprises a cup wheel on one shaft and a rubber wheel on the other shaft, said rubber wheel bearing against the rim of said cup wheel.

4. A structure as defined in claim 1 in which said tool supporting means comprises a tool rest, and said suction producing means is a rotary fan.

5. A structure as defined in claim 1 and a guard for said friction drive, said guard being pivoted to opposite sides of said housing and adapted to be swung to and from a position over said friction drive.

6. A structure as defined in claim 2 in which said cutting tool is a circular saw, and said other end of said hose carries a suction nozzle.

References Cited in the file of this patent

UNITED STATES PATENTS

| Re. 20,687 | Grozier | Apr. 5, 1938 |
| 132,841 | Lane | Nov. 5, 1872 |
| 326,640 | Greenlee | Sept. 22, 1885 |
| 413,606 | Mafford | Oct. 22, 1889 |
| 823,506 | Cadorette et al. | June 19, 1906 |
| 922,840 | Bemiller | May 25, 1909 |
| 2,013,778 | Halvorsen et al. | Sept. 10, 1935 |
| 2,080,475 | Hedgpeth | May 18, 1937 |
| 2,623,269 | Goldschmidt | Dec. 30, 1952 |